(12) United States Patent
Chen et al.

(10) Patent No.: US 10,209,851 B2
(45) Date of Patent: Feb. 19, 2019

(54) MANAGEMENT OF INACTIVE WINDOWS

(71) Applicant: Google Inc., Mountain View, CA (US)

(72) Inventors: Jennifer Shien-Ming Chen, San Francisco, CA (US); Alexander Friedrich Kuscher, San Francisco, CA (US)

(73) Assignee: Google LLC, Mountain View, CA (US)

( * ) Notice: Subject to any disclaimer, the term of this patent is extended or adjusted under 35 U.S.C. 154(b) by 399 days.

(21) Appl. No.: 14/859,216

(22) Filed: Sep. 18, 2015

(65) Prior Publication Data

US 2017/0083166 A1 Mar. 23, 2017

(51) Int. Cl.
| | |
|---|---|
| G06F 3/048 | (2013.01) |
| G06F 3/0481 | (2013.01) |
| G06F 9/46 | (2006.01) |
| G06F 9/48 | (2006.01) |
| G06F 9/451 | (2018.01) |
| G06F 11/14 | (2006.01) |

(52) U.S. Cl.
CPC .......... *G06F 3/0481* (2013.01); *G06F 9/451* (2018.02); *G06F 9/461* (2013.01); *G06F 9/485* (2013.01); *G06F 11/1438* (2013.01)

(58) Field of Classification Search
CPC .............................. G06F 9/4443; G06F 3/0481
USPC ....................................................... 715/806
See application file for complete search history.

(56) References Cited

U.S. PATENT DOCUMENTS

| | | | |
|---|---|---|---|
| 6,978,303 B1 | 12/2005 | McCreesh et al. | |
| 7,757,234 B2 | 7/2010 | Krebs | |
| 8,296,377 B1 | 10/2012 | Jablokov et al. | |
| 8,892,635 B2 | 11/2014 | Sullivan et al. | |
| 9,020,825 B1 | 4/2015 | Garber | |
| 9,436,951 B1 | 9/2016 | Jablokov | |
| 2006/0074658 A1 | 4/2006 | Chadha | |
| 2006/0248404 A1 | 11/2006 | Lindsay et al. | |

(Continued)

FOREIGN PATENT DOCUMENTS

| | | |
|---|---|---|
| WO | WO-2010/141802 A1 | 12/2010 |
| WO | WO-2013/173511 A2 | 11/2013 |

OTHER PUBLICATIONS

International Search Report and Written Opinion dated Nov. 22, 2016, which issued in International Application No. PCT/US2016/054524.

(Continued)

*Primary Examiner* — William D Titcomb
(74) *Attorney, Agent, or Firm* — Morgan, Lewis & Bockius LLP

(57) ABSTRACT

In a computer system, one or more windows displayed on a virtual desktop of a computing device are determined to be inactive. The one or more windows may correspond to one or more processes running on the computing device. In response to determining that the one or more windows are inactive, state information for the one or more corresponding processes is saved and the one or more windows and corresponding processes are terminated. The state information comprises information for restarting the one or more processes and regenerating the one or more windows in a state that existed at a point in time corresponding to the termination of the windows and processes. A user interface is provided for restoring the terminated windows based on the stored state information.

20 Claims, 4 Drawing Sheets

(56) References Cited

U.S. PATENT DOCUMENTS

| | | |
|---|---|---|
| 2006/0265217 A1 | 11/2006 | Bicego et al. |
| 2008/0228496 A1 | 9/2008 | Yu et al. |
| 2008/0255851 A1 | 10/2008 | Ativanichayaphong et al. |
| 2009/0113444 A1 | 4/2009 | Hackborn et al. |
| 2009/0241031 A1 | 9/2009 | Gamaley et al. |
| 2010/0031166 A1 | 2/2010 | Choudhary |
| 2010/0058200 A1 | 3/2010 | Jablokov et al. |
| 2010/0097319 A1* | 4/2010 | Billard ............... G06F 3/0338 345/167 |
| 2010/0115334 A1 | 5/2010 | Malleck et al. |
| 2010/0317406 A1 | 12/2010 | Shigeta |
| 2011/0301955 A1 | 12/2011 | Byrne et al. |
| 2012/0060083 A1 | 3/2012 | Yuan |
| 2012/0167117 A1 | 6/2012 | Kekeh et al. |
| 2012/0303445 A1 | 11/2012 | Jablokov et al. |
| 2013/0110615 A1 | 5/2013 | Lee |
| 2013/0110992 A1 | 5/2013 | Ravindra et al. |
| 2013/0185072 A1 | 7/2013 | Huang et al. |
| 2013/0226590 A1 | 8/2013 | Lee |
| 2013/0238326 A1 | 9/2013 | Kim et al. |
| 2013/0246050 A1 | 9/2013 | Yu et al. |
| 2013/0290233 A1* | 10/2013 | Ferren ............... G06K 9/3266 706/46 |
| 2014/0152597 A1* | 6/2014 | Lee ............... G06F 3/0416 345/173 |
| 2014/0184496 A1* | 7/2014 | Gribetz ............... G02B 27/017 345/156 |
| 2014/0189572 A1 | 7/2014 | Martens et al. |
| 2014/0207446 A1 | 7/2014 | Klein et al. |
| 2014/0229477 A1 | 8/2014 | Costello et al. |
| 2014/0278435 A1 | 9/2014 | Ganong, III et al. |
| 2014/0278436 A1 | 9/2014 | Khanna et al. |
| 2014/0298172 A1* | 10/2014 | Choi ............... G06F 3/0488 715/716 |
| 2014/0302470 A1* | 10/2014 | Zapantis ............... G09B 19/00 434/236 |
| 2014/0365956 A1 | 12/2014 | Karunamuni |
| 2015/0026615 A1* | 1/2015 | Choi ............... G06F 3/0484 715/765 |
| 2015/0199965 A1 | 7/2015 | Leak et al. |
| 2015/0205462 A1 | 7/2015 | Jitkoff |
| 2015/0215665 A1 | 7/2015 | Casagrande |
| 2015/0228275 A1 | 8/2015 | Watanabe et al. |
| 2015/0254058 A1 | 9/2015 | Klein et al. |
| 2015/0254216 A1 | 9/2015 | DeLuca |
| 2015/0255086 A1 | 9/2015 | Pujari |
| 2015/0279366 A1 | 10/2015 | Krestnikov et al. |
| 2015/0332673 A1 | 11/2015 | Li |
| 2015/0340042 A1 | 11/2015 | Sejnoha et al. |
| 2016/0004501 A1 | 1/2016 | Kar et al. |
| 2016/0147400 A1 | 5/2016 | Patten |
| 2016/0170592 A1 | 6/2016 | DeLuca |
| 2017/0220361 A1* | 8/2017 | Sharma ............... G06F 3/0482 |

OTHER PUBLICATIONS

International Search Report and Written Opinion dated Oct. 20, 2016, which issued in International Application No. PCT/US2016/045393.

* cited by examiner

MANAGEMENT OF INACTIVE WINDOWS

BACKGROUND

Most software applications display information in one or more graphical windows. A user may keep multiple applications open at once, interacting with only some of them. For example, the user may keep an application open because the user does not want to take the time to store the working document or bookmark the user's present location. Additionally, content streaming applications may not have the ability to manually save information for later consumption. The user may leave these applications open so that they may be resumed from a last state of operation. In this regard, windows corresponding to open applications may clutter the virtual desktop and consume system resources, and impair operation efficiency of the computing device and of the applications currently in use by the user.

SUMMARY

The subject technology provides a system and computer-implemented method for the management of inactive windows. In one or more implementations, the method comprises determining that one or more windows displayed on a virtual desktop of a computing device are inactive, the one or more windows corresponding to one or more respective processes running on the computing device, and in response to determining that the one or more windows are inactive, storing state information for the one or more processes and terminating the one or more windows and the one or more respective processes, wherein the state information comprises information for restarting the one or more respective processes and regenerating the one or more windows in a state that existed at a point in time corresponding to the terminating. Other aspects include corresponding systems, apparatuses, and computer program products for implementation of the computer-implemented method.

In one or more implementations, the computer-implemented method may further comprise displaying, in a process management interface on the virtual desktop, a first enumeration of process representations corresponding to terminated processes together with a second enumeration of process representations corresponding to active processes, the process representations comprising representations of the one or more respective processes, receiving an indication of a user gesture to move the representations of the one or more respective processes from the first enumeration to the second enumeration, and, in response to the indication, launching the one or more respective processes using the stored state information, the launched one or more respective processes regenerating the one or more windows on the virtual desktop in the state that existed at the point in time corresponding to the terminating.

In one or more implementations, a machine-readable medium includes instructions stored thereon that, when executed by a computing device, cause the computing device to determine that one or more windows displayed on a virtual desktop of a computing device are inactive, the one or more windows corresponding to one or more respective processes running on the computing device, and, in response to determining that the one or more windows are inactive, store state information for the one or more processes and terminating the one or more windows and the one or more respective processes, wherein the state information comprises information for restarting the one or more respective processes and regenerating the one or more windows in a state that existed at a point in time corresponding to the terminating. Other aspects include corresponding methods, systems, apparatuses, and computer program products for implementation of the machine-readable medium.

In one or more implementations, a system comprises one or more processors and a memory. The memory has instructions stored thereon that, when executed by the one or more processors, cause the processors to perform a method comprising determining that one or more windows displayed on a virtual desktop are inactive, the one or more windows corresponding to one or more respective processes, and, in response to determining that the one or more windows are inactive, storing state information for the one or more processes and terminating the one or more windows and the one or more respective processes, wherein the state information comprises information for restarting the one or more respective processes and regenerating the one or more windows in a state that existed at a point in time corresponding to the terminating. Other aspects include corresponding methods, machine-readable mediums, apparatuses, and computer program products for implementation of the system.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
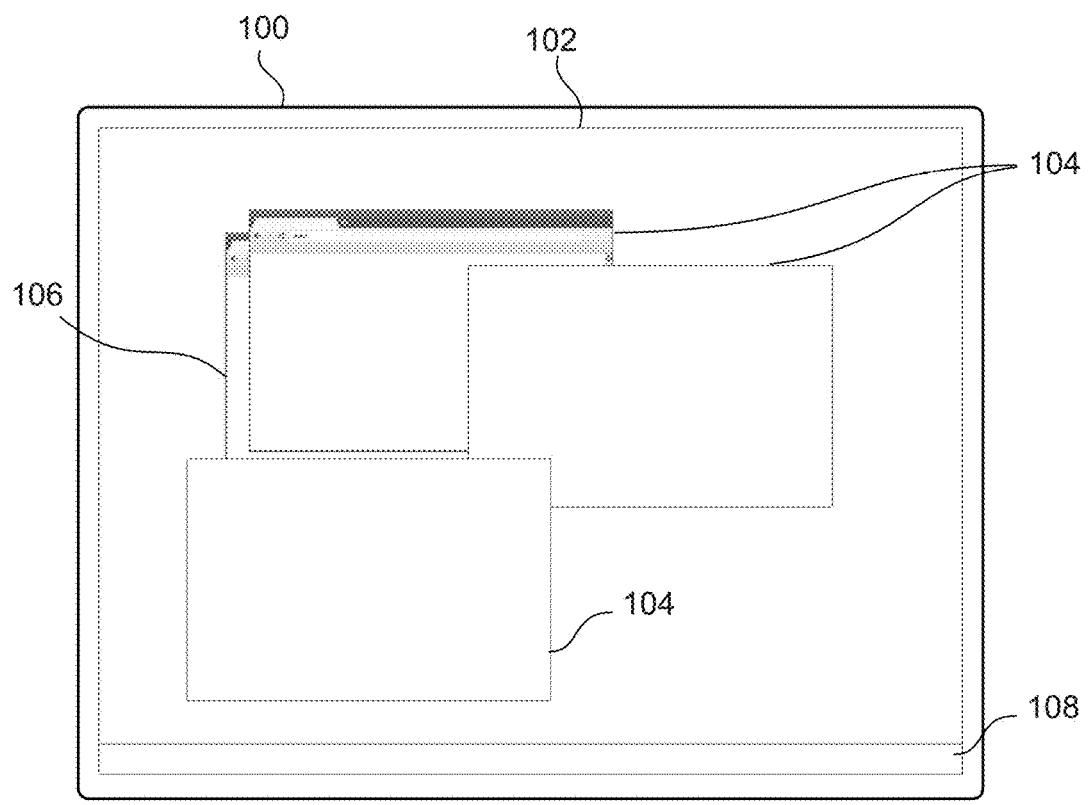
FIG. 1 depicts example computing device, including an example display of a virtual desktop, including multiple active windows.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology manages inactive windows by retiring the windows and their processes to a "temporal space" where the windows and processes no longer consume computing resources such as memory and processor bandwidth. In this regard, the subject technology monitors a virtual desktop to determine whether any windows displayed on the desktop are inactive. Windows may be determined to be inactive upon one or more criteria including, e.g., having no user interaction for more than a predetermined period of time, not being visible to the user or not including any pixels, no longer streaming audio or video for more than a threshold period of time, no means of user input, etc. A window may also be determined to be inactive based on the last type of user interaction with the window (e.g., user was viewing an email inbox vs composing an email). Additionally or in the alternative, a window may be determined to be inactive because the window has not received user-interaction for a threshold period of time during which computing resources consumed by its process are increasing.

Once a window is determined to be inactive, a windows manager saves state information for the window and the process corresponding to the window, adds the process to a historical list of terminated processes, and then terminates the window and its process. In this manner, the window and its process are moved to the temporal space. The state information includes information for restarting the process and regenerating the window in a state that existed at a point in time corresponding to when the window and process were terminated. In one or more implementations, the state information may also include an x-y and/or z-order location of the window.

In one or more implementations, one or more active windows and corresponding processes meeting certain criteria may also be moved to the temporal space (without being terminated). The criteria for moving these windows may include, e.g., assigning a value of importance to the window based on how likely the window will be needed in the future. For example, if the window is being used for composing a document and the document was just saved, the saving of the document may provide an indication that the window is no longer needed, thus decreasing a value indicative of its importance to the user. A low value may be assigned to a window streaming audio with the volume turned down or muted. Windows having lower values may be marked for removal from the virtual desktop based on, e.g., a current availability of system resources.

State information for active windows and processes may be saved in the same manner as for inactive windows. However, the process may be paused (e.g., not allocated processor resources) or assigned a lower priority for accessing resources than other windows on the virtual desktop. Since the active but unused windows are removed, the desktop appears cleaner to a user, but the window is hidden, even though its process may still be in memory (e.g., RAM). The window and process may then be terminated, e.g., during a cleanup operation.

Figure 2:
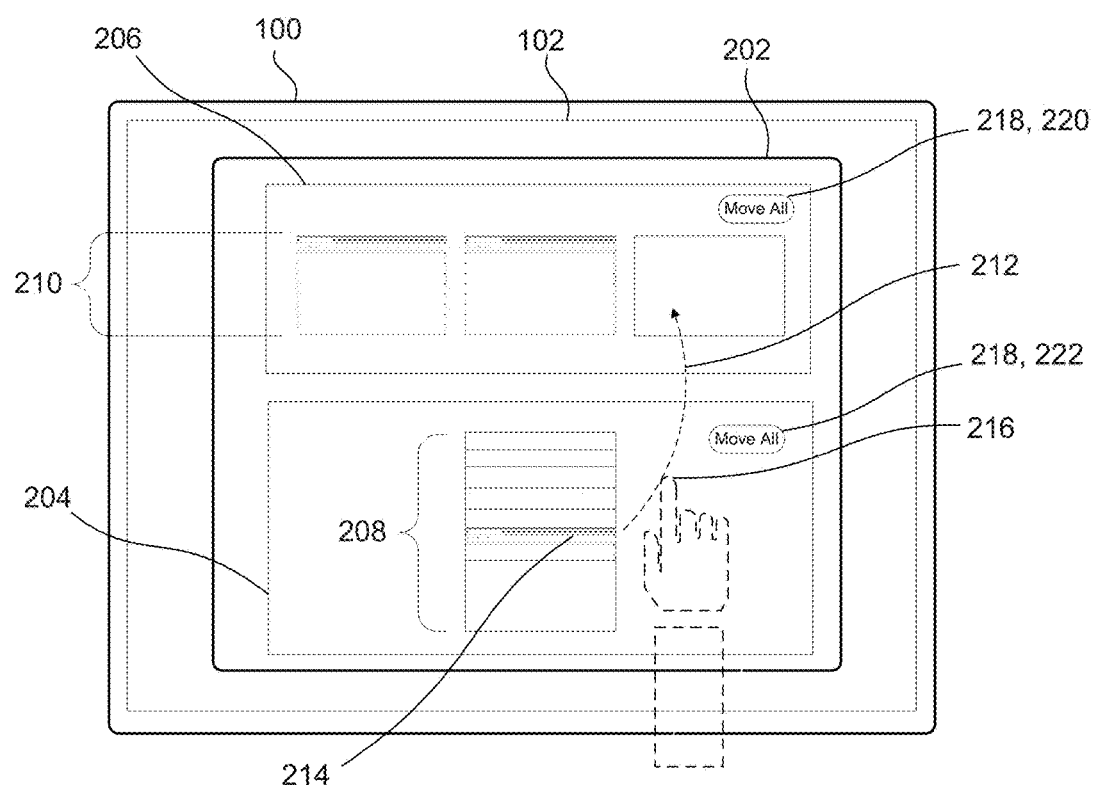
FIG. 2 depicts an example computing device, including an example process management interface for the management of inactive windows.

The subject technology may include a process management interface that allows a user to manage the historical list of terminated processes, and to move them between the temporal space and a "spatial space" in which they are reinstated on the virtual desktop. In this regard, the interface may display a first enumeration of process representations that correspond to terminated processes (e.g., in the historical list) and a second enumeration of process representations that correspond to processes with windows that are active and/or displayed on the virtual desktop (e.g., in the spatial space). Each process representation may be a screenshot of a window. In one or more implementations, the first enumeration may include screenshots that were captured at the point in time in which each window and its corresponding process associated with the process representation were terminated. In one or more implementations (e.g., as depicted in FIG. 2), the first enumeration may be displayed as a stack of overlapping windows and the second enumeration may be displayed as a series of windows spatially organized in rows and/or columns. The interface may also include a control for moving all windows in the spatial space to the temporal space (and vice versa).

A user may access the process management interface and drag representations between the temporal space and the spatial space to either retire processes and windows by saving state information and terminating them, or reinstate them based on saved state information. For example, a user may perform a user gesture to move a representation of a process from the first enumeration to the second enumeration. The gesture may include a pointer action or, when using a touch screen, a finger swipe over a portion of a display screen of the computing device associated with the first and second enumerations. Additionally or in the alternative, each representation may be associated with a selection control (e.g., a checkbox), and may be selected and then moved by activation of a master control.

In response to moving a process representation from the temporal space to the spatial space, the windows manager may launch a new process corresponding to the selected representation using saved state information for the corresponding previously-terminated process. The new process then, based on the state information, generates a window on the virtual desktop in the state that existed at the point in time corresponding to when the process was terminated. Because the window is generated with all the same information as when it was terminated, the user perceives that the process as if it was never terminated.

FIG. 1 depicts example computing device 100, including an example display of a virtual desktop 102, including multiple active windows 104. A user, in the process of using computing device 100, may start multiple processes (e.g., applications), each which may open a window 104. Windows are determined active when they are opened and, in various aspects, remain active as long as they receive some type of user interaction. Some windows may remain active indefinitely, and some windows may remain active so long as content is being produced by the window. For example, a window responsible for streaming audio or video may remain active so long as the audio or video stream is sustained, or until device 100 enters a power-saving mode due to a lack of user interaction with virtual desktop 102.

As more and more windows (and their processes) are activated, virtual desktop 102 may become cluttered. As depicted in FIG. 1, windows 104 may be stacked on top of one another or may overlap. Some windows 106 may become hidden behind other windows, and may be forgotten by the user. Some windows 104 may be minimized to a taskbar 108. In this regard, computing device 100 may include software instructions (e.g., integrated with virtual desktop 102) that function as a "windows manager" to monitor activity of windows displayed on virtual desktop 102. The windows manager may determine windows on virtual desktop 102 that meet certain predetermined criteria to be inactive windows.

In one or more implementations, a window 104 may be determined to be inactive based on the window not receiving user interaction for more than a threshold period of time, or "inactivity threshold." The inactivity threshold may be varied in time or duration (e.g., 5-45 minutes) based on various factors. One factor may include the z-order depth of the window. For example, the inactivity threshold may be decreased based on the depth of the windows z position. A window 106 that is hidden beyond a predetermined amount (e.g., behind one or more other windows), or completely hidden, or minimized, may have a lower inactivity threshold than other windows that are positioned on virtual desktop 102. Additionally or in the alternative, a window may be determined to be inactive based on its z-order depth being below a predetermined threshold number of windows.

The inactivity threshold may also be based on the type of process that generates the window, or the user interface provided by the window, or the type of user interaction that the user interface is configured to receive. Device 100 may include software instructions that determine the type of user interface provided by a window 104. Some user interfaces may be configured with software instructions to signal virtual desktop 102 as to what type of user interaction is occurring within the user interface. For example, an application that allows users to construct documents (e.g., an online email account) may signal virtual desktop when a user has started composing a document (e.g., an email) as opposed to merely having the application running. In this regard, the activity threshold may be increased or suspended if the user interface indicates that the user is in the middle of composing a document. As will be described further, open or active documents may be saved before a process and its window are terminated and then reloaded together with the process and window at a later time.

Additionally of in the alternative, a window may be retired to the temporal space, or its inactivity threshold decreased if, e.g., the window is open and displays no content or pixels. In one or more implementations, the windows manager may be able to determine whether a window 104 is streaming audio or video, and increase or suspend the inactivity threshold while the window is streaming and decrease or eliminate the inactivity threshold when the streaming has stopped or ended.

In one or more implementations, a window may be determined to be inactive based on a threshold amount of resources utilized by the one or more windows being decreased (e.g., decreased irrespective of having no user interaction) over a predetermined period of time. For example, if, during the predetermined period of time, computing resources (e.g., processor bandwidth or memory) utilized by (e.g., allocated to or consumed by) the window or its associated process continue to increase then the window may be moved to the temporal space. Additionally or in the alternative, a window may be determined to be inactive if the amount of computing resources utilized by the window or its associated satisfies a threshold utilization of resources.

The windows manager may use any combination of the foregoing criteria for determining a window is inactive, and for retiring the window and corresponding process to the temporal space. For example, windows may be determined to be inactive based on a predetermined criteria including one, two, or more of a z-order depth of the window(s), at least a predetermined threshold amount of the window(s) being hidden, a predetermined type of process that generates the window(s), a predetermined type of user interface provided by the window(s), an audio and/or video stream provided by the window(s) coming to an end, a lack of pixels being displayed by the window(s), a resource utilization of the window(s) satisfying a predetermined threshold utilization of resources, and a predetermined type of user activity being performed in the window(s). Any of the foregoing criteria may work in conjunction with the activity threshold, with each of the foregoing criteria reducing or increasing (or eliminating the need for) the activity threshold. In one example, a streaming window, on ending a stream, may be immediately set inactive due to its z-order being lower than a predetermined z-order, or if the window has been minimized to taskbar 108, or a threshold amount of the window is otherwise hidden behind one or more other windows.

FIG. 2 depicts the example computing device 100, including an example process management interface 202 for the management of inactive (and active) windows. As described previously, computing device 100 may include software instructions that function as a windows manager. In one or more implementations, once a window is determined to be inactive by the windows manager, the windows manager may store state information for the window and the process corresponding to the window, terminate or otherwise remove the window from virtual desktop 102, terminate or otherwise pause the process associated with the window, and add the process and/or window to a historical list of processes and/or windows. The stored state information includes information for regenerating the window (and process, if necessary) in a state that existed at a point in time corresponding to when the state was stored (e.g., at the time the window was terminated or removed from virtual desktop 102).

The windows manager may, on activation of a control (e.g., an icon, link, or gesture-based action) on virtual desktop, open process management interface 202 which enables a user to manage the historical list of processes (and windows) that were moved to the temporal space (e.g., and were terminated). Process management interface 202 displays a temporal area 204, representative of the temporal space, together with a spatial area 206, representative of the spatial space. Temporal area 204 may include a display of a first enumeration 208 of process representations that correspond to processes (and windows) that were retired to the temporal space by the windows manager, as described above with regard to FIG. 1. Spatial area 206 may include a display of a second enumeration 210 of process representations corresponding to processes and/or windows that are active on virtual desktop 102.

Each process representation in first enumeration 208 and/or second enumeration 210 may resemble or be displayed as a screenshot of a window. In one or more implementations, first enumeration 208 may include screenshots that were captured at the point in time in which each window and its corresponding process was terminated or otherwise moved to the temporal space. In this regard, a screenshot of a window may automatically be captured by the windows manager when the window is determined to be inactive or upon removing the window from virtual desktop 102. The screenshot may then be included in or stored together with the state information that is stored for the window and/or its process.

As depicted in the example of FIG. 2, the process representations in the first enumeration 208 may be displayed as a stack of overlapping windows. These representations may be ordered according to when each corresponding process was terminated or otherwise moved to the temporal space. Second enumeration 210 may be displayed as a series of windows spatially organized in rows and/or columns.

Using process management interface 202, a user may move processes (and their associated windows) between the temporal space, represented by a temporal area 204, and the "spatial space," represented by a spatial area 206. To do this, a user may access process management interface 202 and drag or otherwise move 212 process representations between temporal area 204 and spatial area 206 to perform actions on the corresponding processes. When a respective process representation 214 is moved 212, e.g., from temporal area 204 to spatial area 206, the process associated with the representation is launched using the state information previously stored for the process by the windows manager. The launched process then uses the state information to regenerate a window on virtual desktop 102 in the state that existed at the point in time that the process was terminated or otherwise moved to the temporal space.

In some aspects, a window that is determined to be inactive may be associated with an electronic document. For example, the user of computing device 100 may have been working in the electronic document but suspended work on the document, and the window became inactive due to, among other things, a lack of user interaction for a period of time. In one or more implementations, storing the state information may include storing the content of the electronic document that is associated with an inactive window. The electronic document may be stored in the stored state information of the corresponding process. Additionally or in the alternative, the stored state information may include the content of the document. When the process is launched (e.g., by way of moving the corresponding process representation from temporal area 204 to spatial area 206, the electronic document may be regenerated together with the process and/or the corresponding window. The state information may capture the user's current position within the document along with a history of undo actions.

A user may perform a user gesture 216 to move a selected process representation 214 from first enumeration 208 to the second enumeration 210. The gesture may include a pointer action or, when using a touch screen, a finger swipe over a portion of a display screen of the computing device associated with the selected representation and the first and second enumerations. In this regard, the gesture may be used to drag the representations across process management interface 202. In one or more implementations, each process representation may be associated with a selection control (e.g., a checkbox adjacent the representation or the enumeration in which it resides). A user may select one or more process representations by way of a selection at each corresponding control, and then move the selected process representations by way of the gesture, which may include activation of a master control 218. In one or more implementations, spatial area 206 may also include a control 220 for moving all windows in the spatial space to the temporal space, and temporal area 204 may include a control 222 for moving all windows in the temporal space to the spatial space.

In response to a moving a selected process representation from the temporal space to the spatial space by any of the foregoing mechanisms, the windows manager may launch a new process based on state information corresponding to the selected representation. The new process then, based on the state information, generates a window on the virtual desktop in the state that existed at the point in time corresponding to when the process was previously terminated or otherwise moved to the temporal space. Because the window is generated with all the same information as when it was terminated, including any open documents, the user perceives that the process as if it was never terminated.

Figure 3:
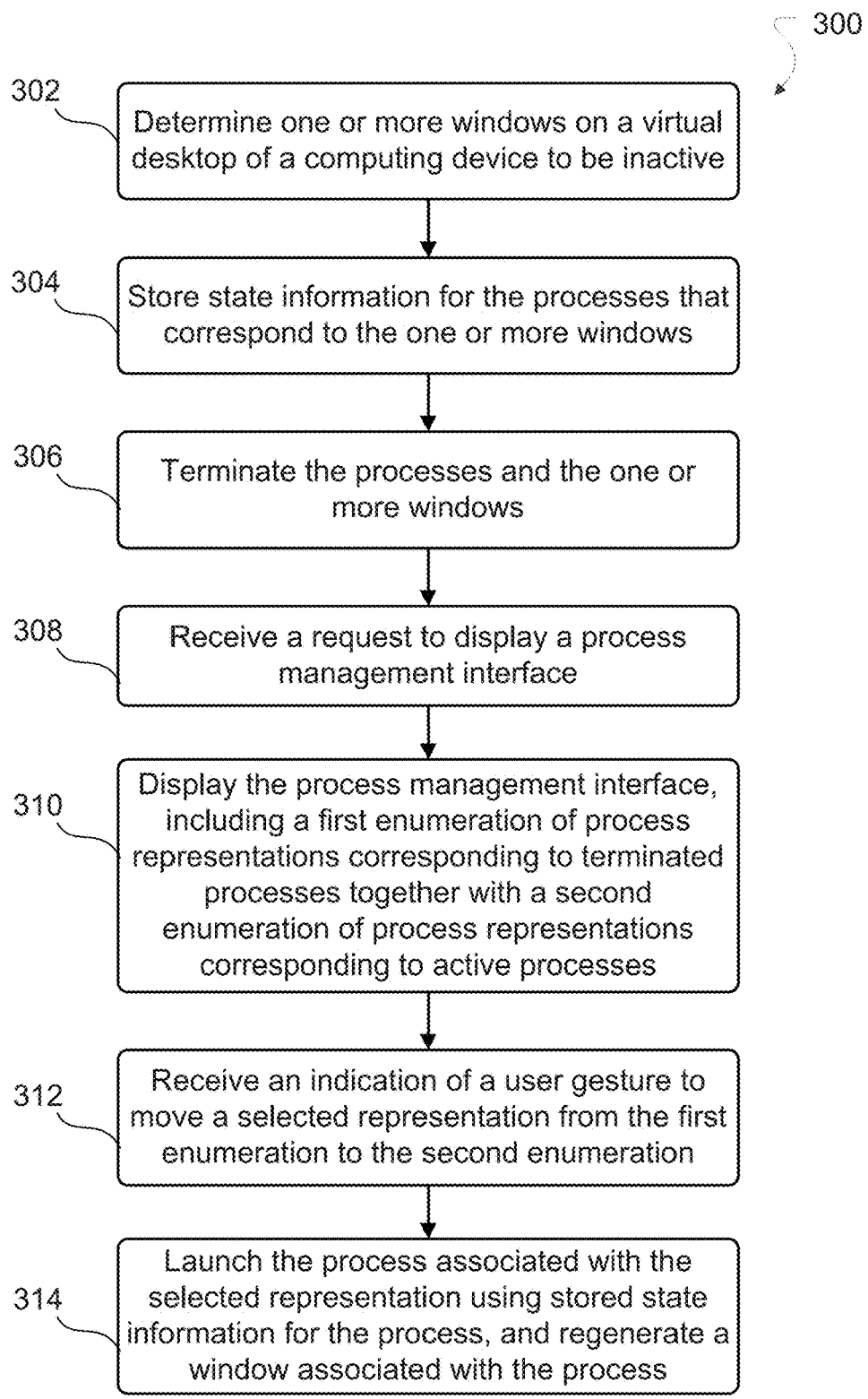
FIG. 3 depicts a flow diagram of an example process for the management of inactive windows.

FIG. 3 depicts an example process 300 for the management of inactive windows, according to aspects of the subject technology. For explanatory purposes, example process 300 is described herein with reference to the components of FIGS. 1 and 2. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

In the depicted example flow diagram, computing device 100, e.g., by way of software instructions functioning as the previously described windows manager, determines one or more windows displayed on virtual desktop 102 to be inactive (302). Each window corresponds to one or more respective processes running on the computing device. The one or more windows may be determined to be inactive using any of the previously described methods, e.g., as described with respect to FIG. 1.

In response to determining that the one or more windows are inactive, computing device 101 stores state information for currently running processes associated with the one or more windows (304). The state information may be stored in an object, in a system registry, in a file, etc. According to one or more implementations, the state information is stored in non-volatile memory. In one or more implementations, the state information may be stored in connection with a user account, e.g., on a server. In this regard, computing device 101 (or windows manager) may be associated with the user account by way of a registration process. Additionally or in the alternative, each application in which state information may be stored may be associated and/or registered with the user account and/or server. Once an application and/or device are registered with the user account, device 100 may store state information for the application and/or device in connection with user account.

The state information includes information to restart the one or more respective processes and to regenerate the one or more windows in a state that existed at a point in time corresponding to when they were terminated. For example, the state information may include application settings, window settings, content and content settings, etc. In one or more implementations, the one or more windows may be associated with an electronic document when the one or more windows are determined to be inactive. Accordingly, the state information may be stored with the content of the electronic document so that the process and window may later be restored together with the document.

For the purpose of this disclosure, processes may be executable applications that operate in memory of computing device 101 according to state information. In this regard, a process initially loads for execution in a default state, but may be executed with predetermined state. When executed with a predetermined state, the newly-instantiated process begins execution in a configuration identical to a previous instantiation of the process. With the exception of viewing the location of the process in memory, it may be almost impossible for a user to identify the difference between the previously instantiated process and a newly-instantiated process that uses the same state as the previously instantiated process.

In one example, a process and corresponding window may be a web browser. The state information may include a web browsing history of, and/or at least one web page opened by, a previously-terminated instance of the web browser. The new instance of the web browser may then automatically open to view the web page at a location in the web page last viewed by the user in the remote instance (and, e.g., at the same location in the page). Additionally or in the alternative, the new instance may be automatically configured to allow navigation of web pages according to the web browsing history of the previously-terminated instance. For example, once the web browser is opened the user may select the 'back' button to navigate backward through a history of web pages viewed in the previously-terminated instance of the web browser.

After the state information is stored, computing device 100 terminates the processes and the one or more windows (306). In this regard, each process is stopped and removed from memory. Any remaining objects or sub-processes generated by the process may be marked for termination or garbage collection.

In one or more implementations, the process may be paused or assigned a lower priority. In this regard, the process, may be prevented from utilizing further processor or memory resources, or may slow its utilization of the resources. For example, an active window may be removed from virtual desktop 102 and the process paused because the window was determined to be in a state of completion (e.g., the content or document associated with the window was just saved). The process state is stored as described previously; however, the process is not terminated and the further utilization of resources by the process prevented.

A value of importance may be assigned to active windows. A window may provide an indication as to whether it is in a state of completion or unimportance. The windows manager may assign a value of importance to a window based on whether the window is actively receiving user-input and whether the window meets other criteria. For example, if the window is being used for composing a document and the document was just saved, the saving of the document (in combination with, e.g., the cessation of user input) may provide an indication that the window is no longer need, thus decreasing the value assigned to the window. A low value may be assigned to a window streaming audio but the volume is turned down or muted. Windows having lower values than others, or that are below a predetermined threshold, may be marked for removal from the virtual desktop based on, e.g., a current availability of system resources.

State information for active windows and processes may be saved in the same manner as for inactive windows. However, the process associated with the window may be paused (e.g., not allocated further processor resources) or assigned a lower priority for accessing resources than other windows on virtual desktop 102. The process may later be terminated, e.g., during a periodic cleanup operation, or cleanup operation triggered by a predetermined RAM or processor utilization threshold.

A user-initiated request to display process management interface 202 on the virtual desktop is received (308). Virtual desktop 102 or taskbar 108 may include a program link (e.g., an icon) for activating process management interface 202. Process management interface 202 may be activated by way of a predetermined gesture, e.g., made with a pointing device, by a predetermined combination of keystrokes, or by way of a swipe or multi-touch action made at a touchscreen of device 100.

Process management interface 202 is displayed (e.g., as a user interface), including first enumeration 208 of process representations corresponding to terminated processes and a second enumeration 210 of process representations corresponding to active processes (310). The process representations displayed by first enumeration 208 may include representations of the previously described one or more respective processes that were terminated. First enumeration 208 may be ordered according to when each process associated with the displayed process representations was terminated. Second enumeration 210 may be displayed as a series of windows spatially organized in rows and/or columns.

In one or more implementations, each process representation may be displayed as or include one or more screenshots of a window corresponding to its corresponding process or window. The screenshot may be taken at a point in time corresponding to when the process or window associated with the process was terminated or otherwise moved to the temporal space. As described previously, the screenshot(s) may have been captured and stored in the state information when the process and/or window was terminated or otherwise moved to the temporal space.

Computing device 101 receives an indication of a user gesture 216 to move one or more selected representations of the one or more respective processes from first enumeration 208 to second enumeration 210 (312). The user gesture may be made with a pointing device, by one or more keystrokes, or by way of a swipe or multi-touch action made at a touchscreen of device 100. As described previously, each process representation may be visually dragged between temporal space 204 and spatial area 206 of process management interface 202 using a pointer device or touch, or finger swipe action at a touchscreen. Additionally or in the alternative, each process representation may be associated with a selection control (e.g., a checkbox), and a user may select one or more process representations by way of selecting one or more of the controls, and then moving the selected representations as a group. The gesture may further include activation of a master control 220 to move the selected representation(s). In one or more implementations, a control 220 may move all processes for windows in the spatial space to the temporal space, or a control 222 may move all processes (and windows) in the temporal space to the spatial space.

In response to receiving the indication to move a selected representation from the first enumeration to the second enumeration, device 101 launches a process associated with the selected representation using stored state information for the process (314). The newly-launched process regenerates the a window corresponding to the process on virtual desktop 102 in a state that existed at the point in time corresponding to when the process and window was terminated or otherwise moved to the temporal space. If the window was previously paused or its priority decreased, the process may be resumed to normal operation and the priority set to its original priority (e.g., based on priority information stored in the state information). In instances where the process included an open document when it was terminated or removed from virtual desktop 102, the newly-launched process may use the stored state information to regenerate the electronic document. The document may then be displayed as opened in the same manner as when the window was determined to be inactive.

Many of the above-described example processes 300, and related features and applications, may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
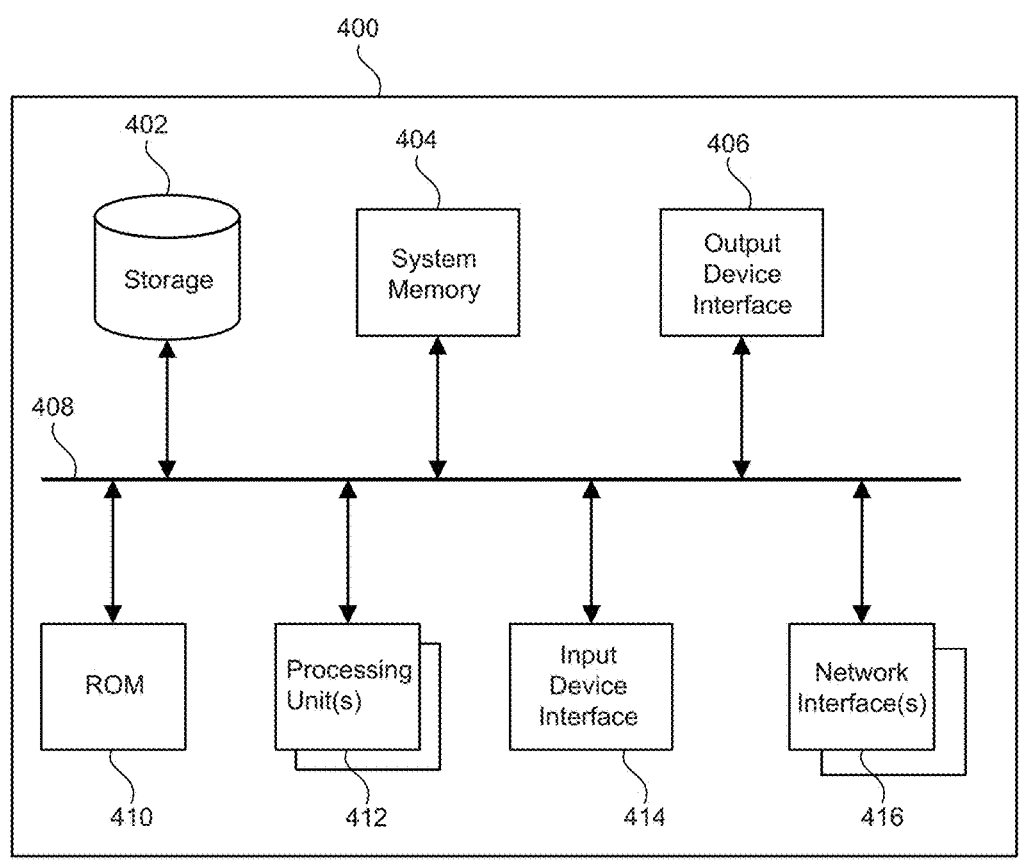
FIG. 4 is a diagram illustrating an example electronic system for use in connection with the management of inactive windows.

FIG. 4 is a diagram illustrating an example electronic system 400 for use in connection with performing actions in a computing device based on sensor data from remote devices, according to one or more aspects of the subject technology. Electronic system 400 may be a computing device for execution of software associated with one or more portions or steps of process 300, or components and processes provided by FIGS. 1-3. Electronic system 400 may be representative of computing device 100. In this regard, electronic system 400 or computing device 100 may be a personal computer or a mobile device such as a smartphone, tablet computer, laptop, PDA, or other touch screen or television with one or more processors embedded therein or coupled thereto, or any other sort of computer-related electronic device having network connectivity.

Electronic system 400 may include various types of computer readable media and interfaces for various other types of computer readable media. In the depicted example, electronic system 400 includes a bus 408, processing unit(s) 412, a system memory 404, a read-only memory (ROM) 410, a permanent storage device 402, an input device interface 414, an output device interface 406, and one or more network interfaces 416. In some implementations, electronic system 400 may include or be integrated with other computing devices or circuitry for operation of the various components and processes previously described.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, e.g., alphanumeric keyboards and pointing devices (also called "cursor control devices"). Output device interfaces 406 enables, e.g., the display of images generated by the electronic system 400. Output devices used with output device interface 406 include, e.g., printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through network interfaces 416. Network interfaces 416 may include, e.g., a wireless access point (e.g., Bluetooth or WiFi) or radio circuitry for connecting to a wireless access point. Network interfaces 416 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 400 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
   determining, by a processor, that one or more windows displayed on a virtual desktop of a computing device are inactive, the one or more windows corresponding to one or more respective processes running on the computing device; and
   in response to determining that the one or more windows are inactive, storing, by the processor, state information for the one or more processes, and terminating the one or more windows and the one or more respective processes,
   wherein the state information comprises information for restarting the one or more respective processes and regenerating the one or more windows in a state that existed at a point in time corresponding to the terminating, wherein the state information comprises coordinate locations of the one or more windows, and wherein the terminating comprises removing the one or more windows from the virtual desktop, stopping the one or more respective processes, removing the one or more respective processes from a memory of the computing device, and marking objects generated by the one or more respective processes for at least one of termination or garbage collection.

2. The computer-implemented method of claim 1, further comprising:
   displaying, in a process management interface on the virtual desktop, a first enumeration of process representations corresponding to terminated processes together with a second enumeration of process representations corresponding to active processes, the process representations comprising representations of the one or more respective processes.

3. The computer-implemented method of claim 2, further comprising:
   receiving, by the processor, an indication of a user gesture to move the representations of the one or more respective processes from the first enumeration to the second enumeration; and
   in response to the indication, launching, by the processor, the one or more respective processes using the stored state information, the launched one or more respective processes regenerating the one or more windows on the virtual desktop in the state that existed at the point in time corresponding to the terminating.

4. The computer-implemented method of claim 3, wherein the gesture comprises a finger swipe over a portion of a display screen of the computing device associated with the first and second enumerations, the finger swipe dragging the representations of the one or more respective processes.

5. The computer-implemented method of claim 4, further comprising:
   determining, by the processor, that an active window displayed on the virtual desktop is in a state of completion, and
   in response to determining that the active window is in the state of completion, storing, by the processor, state information for the active window, and removing the active window from the virtual desktop,
   wherein the first enumeration includes a process representation corresponding to a process associated with the active window, and
   wherein the state information for the active window comprises information for regenerating the active window in a state that existed at a point in time corresponding to when the active window is removed from the virtual desktop.

6. The computer-implemented method of claim 3, wherein the one or more windows are associated with an electronic document when the one or more windows are determined to be inactive, and
   wherein storing, by the processor, the state information comprises storing content of the electronic document, and
   wherein launching, by the processor, the one or more respective processes using the stored state information and regenerating the one or more windows comprises regenerating the electronic document based on the stored content of the electronic stored when the one or more windows are determined to be inactive.

7. The computer-implemented method of claim 2, wherein the representations of the one or more respective processes comprises one or more respective screenshots of the one or more windows at the point in time corresponding to the terminating, and wherein storing, by the processor, the state information for the one or more processes comprises capturing the one or more respective screenshots.

8. The computer-implemented method of claim 2, wherein the first enumeration is ordered according to when each process associated with the displayed process representations was terminated.

9. The computer-implemented method of claim 1, wherein the one or more windows are determined to be inactive based on a threshold amount of resources utilized by the one or more windows being decreased for over a predetermined period of time.

10. The computer-implemented method of claim 1, wherein the one or more windows are determined to be inactive based on a predetermined criteria comprising one or more of a z-order depth of the one or more windows, at least a threshold amount of the one or more windows being hidden, a predetermined type of process that generates the one or more windows, a predetermined type of user interface provided by the one or more windows, an audio or video data stream provided by the one or more windows coming to an end, a lack of pixels in the one or more windows, a resource utilization of the one or more windows satisfying a predetermined threshold utilization of resources, and a predetermined type of user activity being performed in the one or more windows.

11. The computer-implemented method of claim 10, wherein the one or more windows are further determined to be inactive based the one or more windows not receiving user interaction for a predetermined period of time, wherein the predetermined period of time is modified by the predetermined criteria.

12. A machine readable medium including instructions stored thereon that, when executed by a computing device, cause the computing device to:
   determine, by a processor, that one or more windows displayed on a virtual desktop of a computing device are inactive, the one or more windows corresponding to one or more respective processes running on the computing device; and
   in response to determining that the one or more windows are inactive, store, by the processor, state information for the one or more processes and terminating the one or more windows and the one or more respective processes,
   wherein the state information comprises information for restarting the one or more respective processes and regenerating the one or more windows in a state that existed at a point in time corresponding to the terminating, wherein the state information comprises coordinate locations of the one or more windows, and wherein the terminating comprises removing the one or more windows from the virtual desktop, stopping the one or more respective processes, removing the one or more respective processes from a memory of the computing device, and marking objects generated by the one or more respective processes for at least one of termination or garbage collection.

13. The machine readable medium of claim 12, wherein the instructions, when executed, further cause the computing device to:
   display, in a process management interface on the virtual desktop, a first enumeration of process representations corresponding to terminated processes together with a second enumeration of process representations corresponding to active processes;
   receive, by the processor, an indication of a user gesture to move a selected process representation from the first enumeration to the second enumeration, the selected process representation being associated with a terminated process; and
   in response to the indication, launch, by the processor, a new process using stored state information associated with the selected process representation, the new process generating a window on the virtual desktop in a state that existed at a point in time corresponding to when the terminated process was terminated.

14. The machine readable medium of claim 13, wherein the instructions, when executed, further cause the computing device to:
   determine by the processor, without user interaction, that an active window displayed on the virtual desktop should be removed from the virtual desktop;
   store, by the processor, state information for the active window; and
   remove, by the processor, the active window from the virtual desktop;
   wherein the first enumeration includes a process representation corresponding to a process associated with the active window, and
   wherein the state information for the active window comprises information for regenerating the active window in a state that existed at a point in time corresponding to when the active window is removed from the virtual desktop.

15. The machine readable medium of claim 13, wherein one or more windows are associated with an electronic document when the one or more windows are determined to be inactive, and
   wherein storing, by the processor, the state information comprises storing content of the electronic document, and
   wherein launching, by the processor, the new process using the stored state information and generating the window comprises generating the electronic document based on the stored content of the electronic document.

16. The machine readable medium of claim 12, wherein the one or more windows are determined to be inactive based on a predetermined criteria comprising one or more of a z-order depth of the one or more windows, at least a threshold amount of the one or more windows being hidden, a predetermined type of process that generates the one or more windows, a predetermined type of user interface provided by the one or more windows, an audio or video data stream provided by the one or more windows coming to an end, a lack of pixels in the one or more windows, a resource utilization of the one or more windows satisfying a predetermined threshold utilization of resources, and a predetermined type of user activity being performed in the one or more windows.

17. The machine readable medium of claim 16, wherein the one or more windows are further determined to be inactive based the one or more windows not receiving user interaction for a predetermined period of time, wherein the predetermined period of time is modified by the predetermined criteria.

18. A system, comprising:

one or more processors; and a memory, the memory having instructions stored thereon that, when executed by the one or more processors, causes the one or more processors to perform a method comprising:

determining, by the one or more processors, that one or more windows displayed on a virtual desktop are inactive, the one or more windows corresponding to one or more respective processes; and in response to determining that the one or more windows are inactive, storing, by the one or more processors, state information for the one or more processes and terminating the one or more windows and the one or more respective processes, wherein the state information comprises information for restarting the one or more respective processes and regenerating the one or more windows in a state that existed at a point in time corresponding to the terminating, wherein the state information comprises coordinate locations of the one or more windows, and wherein the terminating comprises removing the one or more windows from the virtual desktop, stopping the one or more respective processes, removing the one or more respective processes from a memory of the computing device, and marking objects generated by the one or more respective processes for at least one of termination or garbage collection.

19. The system of claim 18, the method further comprising:

displaying, in a process management interface on the virtual desktop, a first enumeration of process representations corresponding to terminated processes together with a second enumeration of process representations corresponding to active processes;

receiving, by the one or more processors, an indication of a user gesture to move a selected process representation from the first enumeration to the second enumeration, the selected process representation being associated with a terminated process; and in response to the indication, launching, by the one or more processors, a new process using stored state information associated with the selected process representation, the new process generating a window on the virtual desktop in a state that existed at a point in time corresponding to when the terminated process was terminated.

20. The system of claim 18, wherein the one or more windows are determined to be inactive based on a predetermined criteria comprising one or more of a z-order depth of the one or more windows, at least a threshold amount of the one or more windows being hidden, a predetermined type of process that generates the one or more windows, a predetermined type of user interface provided by the one or more windows, an audio or video data stream provided by the one or more windows coming to an end, a lack of pixels in the one or more windows, a resource utilization of the one or more windows satisfying a predetermined threshold utilization of resources, and a predetermined type of user activity being performed in the one or more windows, and wherein the one or more windows are further determined to be inactive based the one or more windows not receiving user interaction for a predetermined period of time, wherein the predetermined period of time is modified by the predetermined criteria.

* * * * *